March 29, 1966  J. D. GRIFFIN  3,243,485
FABRICATION OF FOAMED PLASTIC ARTICLES
Filed July 9, 1963
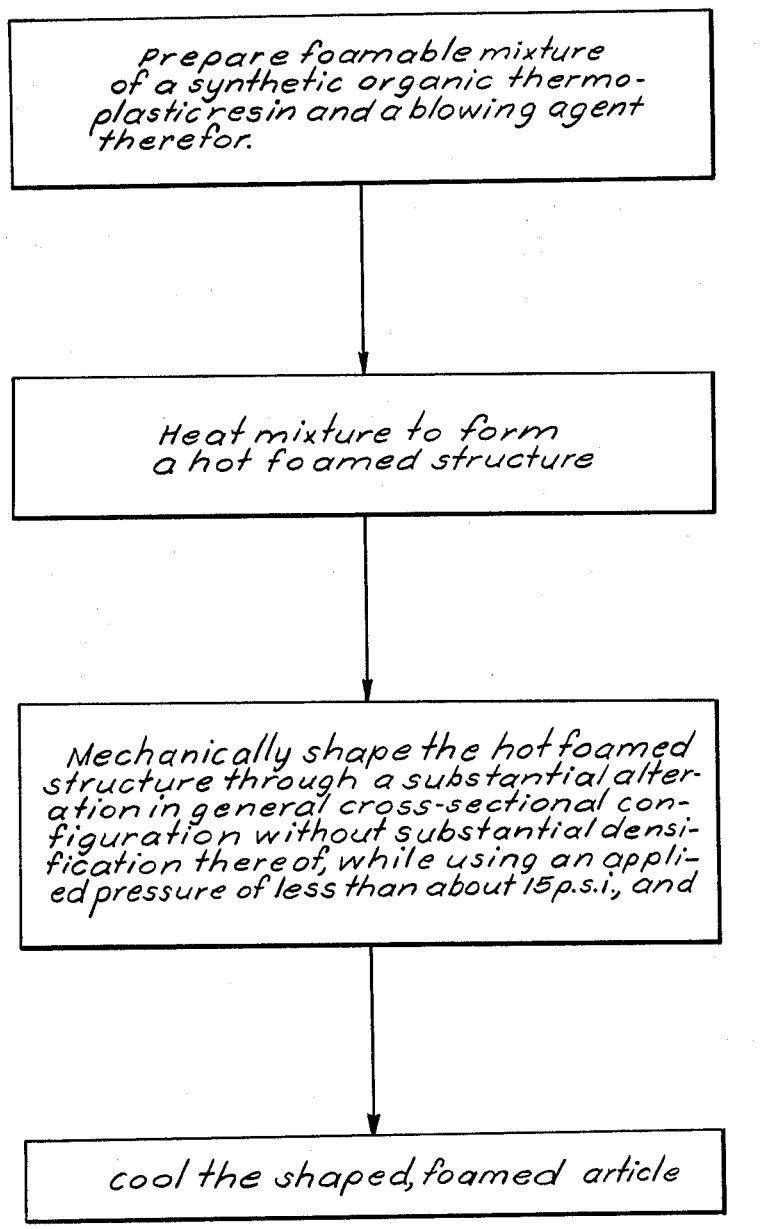
INVENTOR.
John Dennis Griffin
BY
ATTORNEY 3,243,485
FABRICATION OF FOAMED PLASTIC ARTICLES
John Dennis Griffin, Midland, Mich., assignor to The
Dow Chemical Company, Midland, Mich., a corporation of Delaware
Filed July 9, 1963, Ser. No. 293,836
7 Claims. (Cl. 264—51)

This application is a continuation-in-part of copending application Serial No. 633,200, filed January 9, 1957, now abandoned.

This invention relates to an improved method for the fabrication and manufacture of various shaped articles and structures that are comprised of thermoplastic resinous materials in an expanded foam form.

Pursuant to the heretofore known art, a variety of thermoplastic polymeric and resinous materials may be expanded into porous, multicellular, solidified foam-like structures by the action of various propellants or agents for expanding or blowing the materials. The unexpanded material may be in the form of a thermoplastic gel and the like or in the form of completely unexpanded or further expandable discrete particles (such as granules, beads and similar forms), it may also be in the form of more substantial and integral fabricated sections such as block, slabs, sheets and the like which would not, by conventional standards, be considered as having discrete particle dimensions. The blowing agents that may be utilized are usually, in accordance with common practice, gases, gas generating substances (which may be solids under normal conditions) or highly fugacious liquids (which may or may not have a solvent effect on the thermoplastic resinous material) that have been dissolved or otherwise intimately incorporated within the thermoplastic resinous material while it is in an unexpanded form. The presence of thermal energy in, or the application of heat to, an unfoamed thermoplastic material that contains a blowing agent in intimate association therewith causes the blowing agent to be released or thermally expanded, or both, while the thermoplastic material is at or attaining a foaming temperature at which it is sufficiently softened and yieldable to permit the pressure of the thermally expanding blowing agent (or the gas therefrom) to force or expand it into the desired foam structure. In many cases the foaming may be accomplished by simultaneously releasing the blowing agent containing material from a confining pressure while it is at or being heated to a foaming temperature, such as accomplished when preparing extruded foam sheet and the like.

By conventional techniques, desired shaped articles which are comprised of thermoplastic resinous materials in an expanded foam form are fabricated by methods which include: physically machining or otherwise working the foam in a manner much akin to the fabrication of various wooden and the like articles; or by expanding the foam in a confining mold form having a desired pattern or configuration; also by compressing hot foamed articles in a mold to form articles of desired shape having densities substantially greater than the originally prepared foamed material; and by replastifying an already formed expanded foam structure by heating it to a suitable temperature to permit its being fabricated or worked in a thermoplastic condition that has been attained, as indicated, subsequent to its initial formation. The first of the above-mentioned fabricating procedures usually involves considerable waste and may involve unusual requirements of craft and skill. It may also be difficult to provide articles with peculiarly complex shapes in this way. The second direct molding procedure is sometimes difficult to practice with satisfactory results, especially when complex shapes are involved (particularly those having relatively thin and flat cross-sectional dimensions). The third procedure involving substantial densification of hot foamed materials is impractical if not impossible for the mechanical shaping of hot expanded foam structures through a substantial alteration in general cross-sectional configuration, into shaped articles having a foam structure which is free from damage resulting from undesirable densification. It may often be nearly, if not entirely, impossible to foam an expandable mass of thermoplastic resinous material in certain mold forms by conventional techniques while attaining a desirably uniform and relatively homogeneous expanded foam structure. The last of the above-mentioned procedures involves the not inconsiderable expense and inconvenience of reheating the already expanded foam structure to attain suitable thermoplastic temperatures therein that are permissive of deformation and hot-working operations. Oftentimes the dangers and obviously deleterious consequences of local under- or over-heating of the expanded foam structure may attend the reheating and subsequent working operations. In many cases, for example, it is necessary to utilize infrared or dielectric heating means to secure uniform thermoplastic temperatures in an expanded foam structure intended to be hot worked subsequent to its initial preparation and cooling.

It is among the principal objects of the present invention to provide an improved and exceptionally efficacious method for the fabrication and manufacture of shaped articles of desirably uniform and homogeneously expanded or foamed thermoplastic resinous materials having relatively complex configurations, which articles are not significantly densified during fabrication. Other objects and advantages of the invention will be manifest in the description and specification that ensues.

The process of the invention is illustrated diagrammatically in the annexed drawing.

According to the invention, shaped articles of synthetic organic thermoplastic resinous materials in fabricated expanded foam form may advantageously be manufactured by a method which comprises preparing a foamable body comprising an intimate and uniform mixture of a synthetic organic thermoplastic resinous material with an adequate quantity of a blowing agent intimately incorporated or contained therein to expand said body of thermoplastic resinous material to a foam structure when heated to a foaming temperature; expanding said body to a foam structure; mechanically shaping the expanded foam structure transversely through a major cross-sectional configuration change without substantial densification thereof, while it is still hot from said heating and before is has cooled from a thermoplastic condition to form it into the configuration of a desired shaped article; and cooling the resulting shaped article in said configuration to a temperature beneath its thermoplastic range.

According to the process of the present invention, the expanded foam structure is hot worked through a major and substantial change in cross-sectional configuration to assume the configuration of a relatively complex shaped article utilizing a pressure of from about 0.1 to 15 p.s.i., and preferably from about 0.1 to 2.5 p.s.i., and is then permitted to cool from the thermoplastic condition attained during its expansion into a foam structure. Such articles have a desirably uniform and homogeneously foamed structure and a density which is not substantially greater than the non-fabricated hot foamed material. This may most advantageously be accomplished with the utilization of mold forms or shaping platens which press and fabricate the still plastic material to any desired outline and contour. If desired, however, other means for immediately hot working the thermoplastic expanded mass may also be utilized providing pressures not in excess of the hereinbefore stated range are adhered to. Thus it may be worked or molded by means of vacuum forming techniques which may be particularly appropriate and adapted for the purpose when deeply drawn shapes are contemplated. Likewise, various extrusion techniques may also be utilized although, in such instances, the outstanding advantage of directly forming certain irregularly complex shaped articles may not be as conveniently available. As is apparent, practice of the present invention provides a most efficient, economical and facile means for the direct fabrication and manufacture of articles of synthetic organic thermoplastic resinous materials in expanded foam form having relatively complex architecture which are free from undesirable densification.

The freshly expanded thermoplastic body, when it is immediately hot worked and fabricated in a timely manner, as described herein, is sufficiently pliable and readily shapeable to be fabricated and worked into most forms, including relatively complex configurations having curvilinear archiecture and shapes having embossments and various geometric projections thereon. The optimum time for hot working a freshly expanded integral body depends, of course, upon its relative volume and configuration and its individual cooling characteristics. As an example, however, most bodies should be worked within not more than 20–30 seconds after their thermal expansion is completed and, preferably, within 1 or 2 seconds after this time. If desired, auxiliary heating means may be employed to maintain the themoplastic condition of the expanded body until it has been completely fabricated into a desired shape. Such additional heating expedients, however, are usually preferable to avoid, if it is at all possible to do so, by the prompt and forthright working of the freshly expanded thermoplastic body.

Although the optimum conditions for immediately hot working the freshly expanded, still thermoplastic, body may vary with the type and density of the particular body that is being worked and the desired shape that is being fabricated, care should be taken to avoid overly rigorous or excessive shaping influences that might physically damage the expanded foam structure or compress it into an undesirably dense mass. For example, when the hot working step is performed by means of compression or the like molding techniques, utilizing pressures in excess of about 15 pounds per square inch the so-formed articles are often characterized by irregular and nonhomogeneous foamed structures having undesirable densification.

When the integral expanded body being immediately hot worked is in a large sheet-like or relatively thin and flat form, it often facilitates the operation to maintain it spread out, as with a tension frame, after it has been expanded and while being manipulated into a mold form or the like. It may otherwise be extremely difficult and vexatious to handle the generally limp, thermoplastic body which may react very much like a sleazy textile fabric. Although any plastic body may be expanded and fabricated into shaped foam articles in accordance with the method of the invention, it is frequently a particular advantage to utilize bodies that are in relatively thin and flat sheet or slab-like sections, such as extruded sheets and the like, particularly those having a thickness between about 0.010 and 0.250 inch. When utilizing freshly extruded foamed sheets, however, thicknesses of up to about 2 inches or more may be used.

Any of a wide variety of gaseous, fugacious liquid or normally solid gas-generating blowing agents may be incorporated in the body of synthetic organic thermoplastic resinous material by any means that is convenient and adapted to the purpose. Thus, normally solid blowing agents may be incorporated in the thermoplastic resinous body prior to its fabrication, or normally gaseous blowing agents may be incorporated into a hot gel-like viscous polymeric material. Normally liquid materials may be similarly incorporated or they may be added to the body by impregnation thereof after it has been formed. It is usually expedient to incorporate a gaseous blowing agent under pressure in order to reduce the time which may be required for the operation. Carbon dioxide may be employed with great advantage as the blowing agent although such materials as dichlorodifluoromethane and pentane or other low boiling hydrocarbons may also be employed with benefit, as may certain known nitrogen or carbon dioxide-liberating solids.

The amount of a gaseous or fugacious liquid blowing agent which is incorporated under given conditions of pressure, temperature and time depends, among other known factors, upon its molecular weight and thermal expanding characteristics as well as upon the thermoplastic properties of the particular thermoplastic resinous material that is involved. Usually, for example, an amount of carbon dioxide, based on the weight of the thermoplastic resinous material, between about 2 and 12 percent by weight may be a suitable and efficient amount for many of the thermoplastic resinous materials that are commonly employed for expanded foam structures. Likewise, between about 5 and 15 percent by weight of dichlorodifluoromethane is generally a suitable and efficient amount in many instances. Solid gas-generating blowing agents, when employed, may be utilized in conventional proportions.

Suitable amounts of a gaseous or fugacious liquid blowing agent may be incorporated by subjecting the unexpanded plastic body to contact with the blowing agent under pressures from atmospheric up to about 2,000 pounds per square inch at temperatures near the freezing point of water or lower for periods of time between about one hour and two weeks or by incorporating such blowing agent to unexpanded plastics which are in the form of hot gel-like viscous bodies. This, of course, may vary with particular blowing agents and specific thermoplastic resinous materials, as well as with the size and shape of the integral, unexpanded body that is involved. It will also vary as to the time requirement when greater or lesser pressures are utilized or if the temperature is altered. When the impregnation of the blowing agent is accomplished under the influence of superatmospheric pressure, it is usually advantageous to remove the impregnated plastic body from the pressurizing atmosphere after the blowing agent has been incorporated therein. This facilitates expanding the mass at lower foaming temperatures and precludes the practical difficulties that may be encountered when operating under superatmospheric pressure, especially if a relatively high pressure is employed.

Any synthetic organic thermoplastic resinous material which is adapted to be foamed or expanded by conventional techniques may be utilized with advantage in the practice of the method of the invention. Merely for purposes of convenient illustration, however, without intending to be restricted thereto, the invention is particularly adapted to be practiced with styrene polymer bodies, which may be in an essentially linear or in a cross-linked form, as being generally representative and docent of expandable thermoplastic resinous materials and as being especially representative of alkenyl aromatic compounds which contain at least about 50 percent by weight of at least one alkenyl aromatic compound having the general formula $R-CZ=CH_2$, wherein R is an aromatic radical and Z is selected from the group consisting of a hydrogen atom and a methyl radical. Expandable, thermoplastic polymers and copolymers or styrene and polymers and copolymers of alpha-methyl styrene, ar-methyl styrene or vinyl toluene, mono- and di-chlorostyrene and ar-dimethyl styrene, including copolymers with such materials as vinylidene chloride and acrylonitrile; cross-linked copolymers containing small amounts of such cross-linking, polyfunctional substances as divinyl benzene; and graft copolymers with other polymeric substances (such as other elastomer polymers) may frequently be utilized with benefits commensurate with or in excess of those which are derivable from employment of polystyrene alone.

Oftentimes this may also be the case with other expandable thermoplastic resinous materials including various copolymers of vinylidene chloride (which are frequently generically characterized as being sarans) and thermoplastic resinous materials which may be comprised of polymers and copolymers of methyl methacrylate, ethyl acrylate and other derivatives of acrylic acid, such as their homopolymers and copolymers of methyl methacrylate and vinylidene chloride, polymers and copolymers of vinyl acetate and vinyl butyral and the like; halogenated hydrocarbon polyolefins including chlorinated polyethylenes and polypropylenes and the like; and various thermoplastic and thermoplastified derivatives of cellulose including cellulose nitrate and cellulose acetate.

The thermoplastic resinous material may be subsequently expanded in any suitable manner. A sufficient quantity of heat should be employed to raise the temperature of the expandable mass of thermoplastic resinous material to a foaming temperature. Most expandable polystyrene and like materials, for example, require a temperature of at least about 185–190° F. for this purpose. Conversely, the application of excessive quantities of heat should be avoided to preclude overheating and thermally degrading or decomposing the expanded thermoplastic resinous material. Certain types of expandable polystyrene and like materials may be caused to collapse from a foam structure after they have been expanded when they are subjected to a temperature in the range from 275° F. to 400° F. They may even decompose at high temperatures. The application of heat should only be for the required period to fully expand the mass, especially when relatively more heat sensitive thermoplastic resinous materials are involved. In this connection, it is generally advantageous to expand the integral, expandable body to a foam structure volume that is at least about three times as large as its original unexpanded volume. Usually, cross-linked polymeric materials are less sensitive to extremes of temperature or prolonged exposures to heat at elevated temperatures and consequently tend to produce expanded foam structures which have a greater thermal stability.

The heat energy which is provided for foaming the integral, solid, blowing agent-containing bodies of thermoplastic resinous material may be derived from conventional sources such as steam, hot air and other heated gases, heated liquid baths, heated extruders; or by heat from conductive heat-exchanging surfaces such as heated platens and the like; or radiant heat energy or heat from infrared sources may be provided. If desired, dielectric or other forms of high frequency heating may also be employed for the purpose.

Further illustration of the invention is provided in and by the following example.

*Example*

An extruded sheet was fabricated from a styrene graft copolymer that was comprised of 5 parts by weight of a copolymer of styrene and butadiene which contained about 75 percent by weight of butadiene polymerized in the copolymer molecule which had been interpolymerized with about 95 parts by weight of styrene. The sheet had dimensions of about 0.021 x 15 x 19.5 inches and a weight of about 0.224 pound. It was subjected for one week to an atmosphere of carbon dioxide under about atmospheric pressure and at a temperature in the neighborhood of −70° C. A 14 x 19 inch section of the so-impregnated carbon dioxide containing sheet was then placed within a frame in which it was peripherally maintained by uniformly spaced and attached resilient mounting members which tended, by means of their tractile tensioning influence, to keep the sheet in a spread out condition. The mounted sheet was then expanded to a foam structure having dimensions of about 0.045 x 30 x 43 inches by immersing it for about 10 seconds in a bath of diethylene glycol which was at a temperature of about 260° F. After the immersion period was completed, the foamed sheet was quickly removed from the bath and, with an elapsed interval of only two to five seconds while it was still in a thermoplastic and pliable condition from its foaming, was placed between matching compression mold forms in order to provide a shaped sheet, useful for tower packing, which had approximately the same outlines and configuration as the shaped article which is pictured in FIGURES 8, 9 and 10 and described in the article by G. A. Griess in Industrial and Engineering Chemistry, 47, 1347 (1955). The molded sheet had been deformed a distance of approximately one inch, as a maximum, in each lateral direction from its originally flat pattern. A molding pressure of less than about 2.5 pounds per square inch had been employed to fabricate the thermoplastic foamed sheet immediately upon its expansion. After being cooled and trimmed to a 21 x 37 inch size, coterminous with the mold form, the shaped sheet of expanded foam had a weight of about 0.12 pound. It was found to be a strong and relatively rigid structure.

When the foregoing was identically repeated, excepting to employ a solid sheet having initial unexpanded dimensions of about 0.041 x 14 x 20 inches and a weight of about 0.432 pound, the finally obtained 21 x 37 inch molded article had a thickness of about 0.085 inch and a weight of about 0.25 pound. In comparison, an identically sized article of the same type molded by conventional means and having a thickness of 0.085 inch has a weight of about 1.9 pounds.

Similar good results are obtained by simultaneously expanding and shaping blowing agent containing thermoplastic polymeric bodies prepared by incorporation of a gaseous blowing agent, such as $CO_2$, to a hot gel-like, viscous thermoplastic polymeric material, such as the alkenyl aromatic polymeric materials hereinbefore described, which are contained in a plastics extruder, followed by extrusion of the same to expand such material into a foamed sheet, while simultaneously shaping said foamed sheet into a desirable shaped article, by any of the methods as described herein.

Many other types and varieties of expanded foam articles can be efficaciously manufactured and fabricated in accordance with the improved method of the invention.

Individuals who are skilled in the art will appreciate that many changes and modifications in the practice of the present invention can be readily entered into without substantially departing from its intended spirit and scope. Therefore it is to be fully understood that the invention is not to be limited or in any way considered as being restricted to or by the preferred didactic embodiments thereof which are included in the foregoing description and specification. Rather, it is to be interpreted and liberally construed in the light of what is set forth and defined in the hereto appended claims.

What is claimed is:

1. A method for the manufacture of shaped articles from extruded synthetic organic thermoplastic resinous sheet material after said material is in an essentially completely expanded foam form which comprises: mechanically shaping said expanded sheet material through a major and substantial change in cross-sectional configuration without substantial densification thereof by means of an applied pressure of between about 0.1 to less than 15 pounds per square inch absolute pressure, while said expanded sheet material is still hot and thermoplastic from extrusion.

2. The method of claim 1, wherein the synthetic organic thermoplastic resinous material comprises an alkenyl aromatic polymeric material which contains in its composition at least about 50 percent by weight of at least one alkenyl aromatic compound having the general formula: $R-CZ=CH_2$, wherein R is an aromatic radical and Z is selected from the group consisting of a hydrogen atom and a methyl radical.

3. The method of claim 1, wherein said synthetic organic thermoplastic resinous material comprises a styrene polymer.

4. The method of claim 1, wherein said synthetic organic thermoplastic resinous material comprises a vinyl toluene polymer.

5. The method of claim 1, wherein the expanded foam structure is mechanically shaped through a major and substantial change in cross-sectional configuration without substantial densification thereof within about 30 seconds after it has been fully expanded.

6. The method of claim 1, wherein the expanded foamed structure is mechanically shaped through a major and substantial change in cross-sectional configuration without substantial densification thereof by vacuum molding techniques.

7. The method of claim 1, wherein said applied pressure is between about 0.1 and 2.5 pounds per square inch.

References Cited by the Examiner
UNITED STATES PATENTS

| | | | |
|---|---|---|---|
| 2,537,977 | 1/1951 | Dulmage | 264—53 |
| 2,740,157 | 4/1956 | McCurdy et al. | 264—53 |
| 2,797,443 | 7/1957 | Carlson | 264—53 XR |
| 2,857,625 | 10/1958 | Carlson | 264—53 |
| 2,873,481 | 2/1959 | Semegen | 264—48 |
| 2,905,972 | 9/1959 | Aykanian et al. | 264—53 |
| 2,945,261 | 7/1960 | Aykanian et al. | 264—53 |
| 3,121,130 | 2/1964 | Wiley et al. | 264—53 |

ALEXANDER H. BRODMERKEL, *Primary Examiner.*

ALFRED L. LEAVITT, *Examiner.*

P. E. ANDERSON, *Assistant Examiner.*